(12) United States Patent
Tamura

(10) Patent No.: US 7,113,386 B2
(45) Date of Patent: Sep. 26, 2006

(54) ELECTROSTATIC ACTUATOR

(75) Inventor: Masaya Tamura, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 362 days.

(21) Appl. No.: 10/721,364

(22) Filed: Nov. 26, 2003

(65) Prior Publication Data

US 2004/0145854 A1    Jul. 29, 2004

(30) Foreign Application Priority Data

Jan. 24, 2003  (JP) ............................. 2003-016538
Oct. 3, 2003   (JP) ............................. 2003-346025

(51) Int. Cl.
*H01H 47/00* (2006.01)

(52) U.S. Cl. .................................................. 361/207

(58) Field of Classification Search ................ 361/207, 361/278; 360/294.4, 294.3; 310/309
See application file for complete search history.

(56) References Cited

U.S. PATENT DOCUMENTS 6,229,640 B1    5/2001  Zhang
6,315,462 B1   11/2001  Anthamatten et al.
6,424,504 B1 *  7/2002  Abe et al. ................ 360/294.4

* cited by examiner

Primary Examiner—Stephen W. Jackson
(74) Attorney, Agent, or Firm—Keating & Bennett, LLP

(57) ABSTRACT

An electrostatic actuator includes a movable piece provided on a substrate via supporting beams such that the movable piece can be displaced in the Y-axial direction. The movable piece is displaced by an electrostatic force between movable and stationary electrodes to drive a mirror, so that an optical path of an optical device is switched over. The electrode plates of the movable electrode have lengths in the Y-axial direction which are stepwise decreased in order from the electrode plate nearest to the movable piece to the electrode plate farthest from the movable piece. Thus, the total overlapping length of the electrode plates of the stationary and movable electrodes is reduced to a minimum smallest value. Therefore, even if the sizes of the electrode plates are varied, the movable piece is prevented from being displaced and inclined due to electrostatic forces in the X-axial direction. Thus, the movable piece is stably operated.

20 Claims, 15 Drawing Sheets

ELECTROSTATIC ACTUATOR

BACKGROUND OF THE INVENTION

1. Field of the Invention

The present invention relates to an electrostatic actuator in which a movable piece disposed on a substrate can be driven by an electrostatic force between electrodes.

2. Description of the Related Art

Generally, electrostatic actuators are used in optical communication devices such as optical switches, optical shutters, optical attenuators, angular velocity sensors, resonators, and suitable devices (for example, see U.S. Pat. No. 6,315,462).

Conventional electrostatic actuators include a substrate, a movable piece supported on the substrate, a stationary electrode composed of a plurality of electrode plates disposed on the substrate in a comb-like pattern, and a movable electrode composed of a plurality of electrode plates provided for the movable electrode. The plurality of the electrode plates of the movable electrode extend toward the electrode plates of the stationary electrode to have a comb-like pattern. The movable electrode causes the movable piece to be displaced by an electrostatic force generated between the stationary electrode and the movable electrode.

The movable piece is supported on the substrate by supporting beams in such a manner that it can be displaced in a predetermined direction. The stationary electrode and the movable electrode are formed, for example, by etching a silicon material. A plurality of the formed electrode plates having lengths substantially equal to each other are arranged in comb-like patterns. To drive the movable piece, a voltage is applied between the stationary electrode and the movable electrode. The electrode plates of the movable electrode are attracted the electrode plates of the stationary electrode. The stationary electrodes and the movable electrodes are meshed with each other. Thus, the movable piece is displaced.

While the electrodes plates of the stationary electrode and the movable electrode are meshed with each other, they overlap and are opposed to each other. Thus, electrostatic forces act on the electrode plates not only in the length direction (displacement direction of the movable piece) of the electrode plates but also in the direction (width direction of the electrode plates) that is perpendicular to the displacement direction. Therefore, for example, stationary electrodes and movable electrodes are arranged in a right-left symmetrical pattern with respect to the axial line in the displacement direction of the movable piece. Therefore, electrostatic forces in the width direction applied to the respective electrode plates on the right and left sides cancel each other out.

For example, the electrostatic actuator having the above-described configuration is used for an angular velocity sensor, a resonator, or suitable device. In this case, an AC voltage or the like is applied across a stationary electrode and a movable electrode. Thereby, the movable piece of the actuator can be vibrated in its resonant state of which the displacement (amplitude) is in the range of about several μm to about 20 μm.

In the case of electrostatic actuators used in optical switches or other optical device, a mirror provided on a movable piece is caused to enter or emerge from a light path so that a light beam is reflected or transmitted. Thus, the optical path is switched over. In this case, it is necessary to displace the movable piece (including the mirror) by a distance that is at least larger than the diameter of a light beam so that switching is securely carried out. Thus, in many cases, the displacement is in the range of about 20 μm to 100 μm.

Accordingly, in the conventional actuator the stationary electrode and the movable electrode are formed in a symmetric pattern. When the conventional electrostatic actuator is operated, the movable piece is displaced in a predetermined direction and the electrostatic forces in the width direction (in the direction perpendicular to the displacement direction) cancel each other out.

However, the sizes and shapes of the stationary electrodes and the movable electrodes tend to be dispersed when they are formed, due to errors in size, processing, or the like. Accordingly, in many cases, the shapes of these electrode plates are slightly unsymmetrical.

As a result, when the actuator is operated, the electrostatic forces in the width direction applied to the respective electrode plates of the movable electrodes are not sufficiently cancelled out. In some cases, the movable electrode is displaced so as to be inclined and come into contact with the stationary electrode. Therefore, in the conventional actuator, problems occur in some cases in that the movable piece comes into contact with the stationary piece so that the movable piece can not be sufficiently displaced, or the operation of the actuator becomes unstable. Thus, the reliability of the conventional actuator is reduced.

In particular, for electrostatic actuators such as optical switches or other optical devices, it is necessary to cause a large displacement of the movable piece in its static state. That is, in contrast to conventional actuators used in angular velocity sensors or suitable device, conventional actuators used in optical devices are not used in their resonant state. Thus, when the conventional actuator is operated, the electrode plates of the stationary electrode and of the movable electrode overlap each other over relatively large lengths thereof.

Therefore, large electrostatic forces depending on the overlapping lengths of the electrode plates are applied to the movable electrodes in the width direction. Thus, problematically, because the electrostatic forces can not be cancelled out sufficiently by the electrode shape or by other suitable means, the operation of the conventional actuator becomes insufficient.

SUMMARY OF THE INVENTION

In order to overcome the problems described above, preferred embodiments of the present invention provide an electrostatic actuator in which the movable piece can be displaced into its stable state and can be prevented from being inclined, and the reliability is greatly improved.

According to a first preferred embodiment of the present invention, an electrostatic type actuator includes a substrate, a stationary electrode including a plurality of electrode plates arranged on the substrate in a comb-like pattern, and a movable piece supported on the substrate and including a movable electrode including a plurality of electrode plates extending toward the electrode plates of the stationary electrode and arranged in a comb-like pattern, wherein the movable electrode displaces the movable piece by the electrostatic force generated between the movable electrode and the stationary electrode. In one of the stationary electrode and the movable electrode, at least one of the lengths of the plurality of the electrode plates is different from a length of another of the plurality of electrode plates.

According to preferred embodiments of the present invention, the electrode plates of at least one of the stationary electrode and the movable electrode preferably have lengths which are different. Therefore, when the movable piece is driven, an electrostatic force is generated between the electrode plate having a relatively large electrode and the opposite electrode plate, and the movable piece is displaced by the electrostatic force. Thereby, the electrode plates of the stationary electrode and those of the movable electrode are sequentially meshed with each other in correspondence with the displacement of the movable piece, that is, in the order of from the electrode plate having the largest length toward the electrode plate having the smallest length. Therefore, the movable piece can be considerably displaced until all of the electrode plates are meshed.

In this case, whichever position the movable piece is displaced to, the total meshing (overlapping) lengths of the respective electrode plates on the stationary side and on the movable side can be reduced to a necessary and smallest value for driving of the movable piece at that position. Thereby, an electrostatic force can be suppressed from being generated in a direction different from the displacement direction of the movable piece when the electrode plates are overlapped. Thus, the movable piece is stably displaced in a predetermined direction. Accordingly, the displacement of the movable piece is sufficiently secured, and the reliability is greatly improved.

Preferably, the lengths of the electrode plates of the stationary electrode are different, and the lengths of the electrode plates of the movable electrode are different. Therefore, a length-difference can be provided for not only one of the stationary electrode and the movable electrode but also the other electrode. As a result, when the movable piece is displaced by an electrostatic force, the overlapping lengths over which the stationary-side and movable-side electrode plates are meshed with each other is increased by the sum of the length-differences of both electrode plates. Thus, the electrostatic forces between these electrode plates can be sufficiently increased correspondingly to the displacement of the movable piece.

Accordingly, the length-difference between adjacent electrode plates of the stationary electrode and that between adjacent electrode plates of the movable electrode can be set at a small value, while the electrostatic forces having high strengths are produced. Therefore, when a movable-side electrode plate is moved into the space between adjacent stationary-side electrode plates, the movable-side electrode plate is prevented from being inclined because of the differences in electrostatic force caused by the length-difference between the electrode plates on both of the sides. Accordingly, electrostatic forces which are applied from the electrode plates on both of the sides to the electrode plate are well balanced. Thus, the operation of the movable piece is stable.

Also, preferably, the electrode plates of at least one of the stationary electrode and the movable electrode have lengths which are stepwise different from each other. Thus, the length-difference of adjacent electrode plates can be set at a small value. Thus, when a movable-side electrode plate is moved in the space between the adjacent stationary-side electrode plates, inclination of the electrode plate caused the difference in electrostatic force caused by the length-difference between the electrode plates on both of the sides, is suppressed. Accordingly, the electrostatic forces applied from the electrode plates on both of the sides to the electrode plate as the opponent are well balanced. The operation of the movable piece is stable.

Preferably, the electrode plates of at least one of the stationary electrode and the movable electrode have lengths which are stepwise decreased in order from the electrode plate nearest to the movable piece to the electrode plate farthest from the movable piece. The overlapping length of the electrode plates on the stationary side and the movable side provided in positions relatively far from the movable piece is reduced. Thereby, the electrostatic force is prevented from having a large rotational moment at a position far from the movable piece and from being added to the movable piece. Thus, the movable piece is stably displaced in a predetermined displacement direction.

Preferably, the electrode plates of at least one of the stationary electrode and the movable electrode define sets of plural electrodes having equal lengths, and the length of at least one set of electrode plates is different from the length of another set of electrode plates. Accordingly, for displacement of the movable piece from the initial position via an intermediate position to the final switched-over position, the number of electrode plates to be meshed at the respective positions can be set at different values. Thereby, an electrostatic force having an appropriate strength corresponding to the position of the movable piece can be generated. Thus, the design flexibility is enhanced.

Preferably, of the electrode plates of at least the other of the stationary electrode and the movable electrode, the electrode plates of the other electrode to be moved into the spaces between the sets of the electrode plates of the one electrode for meshing have widths larger than those of the neighboring electrode plates of the other electrode. Thus, the strength of the electrode plates of the other electrode to be moved for meshing into the space between sets each including electrode plates (the space between two electrode plates having different lengths). Accordingly, even if the strengths of electrostatic forces applied to the electrode plates of the stationary and movable electrodes are large, the electrode plate is prevented from being deflected and inclined. Thus, the movable piece is stably driven.

Preferably, some of the electrode plates of at least one of the stationary electrode and the movable electrode have lengths which are equal to each other. Thus, for example, at least two of the plurality of the electrode plates of the stationary electrode or the movable electrode have equal lengths. The other electrode plates can be formed in different lengths. Thus, the design flexibility is enhanced.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
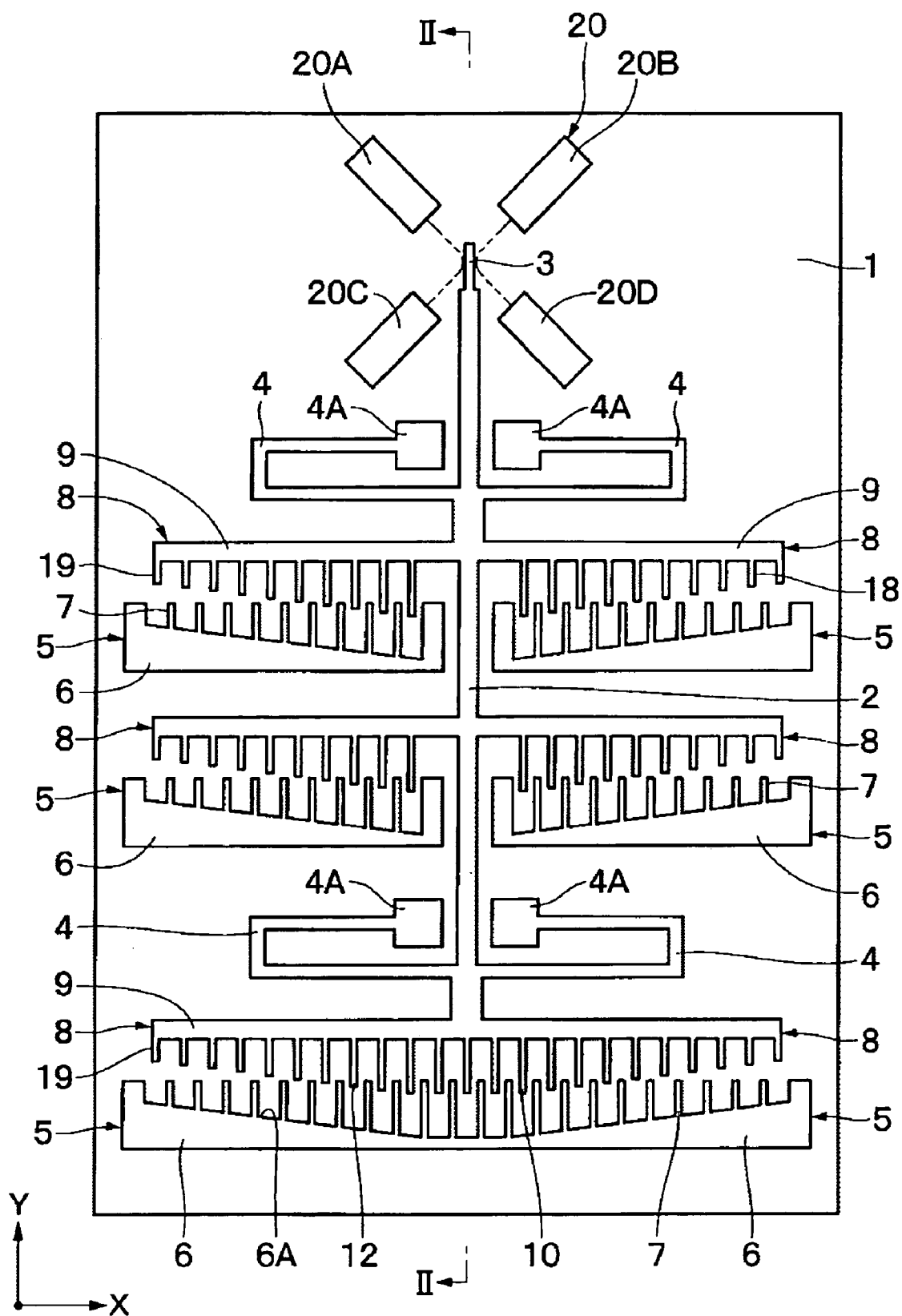
FIG. 1 is a plan view of an optical switching device according to a first preferred embodiment of the present invention.

Hereinafter, an electrostatic actuator according to preferred embodiments of the present invention will be described with reference to the accompanying drawings.

FIGS. 1 to 9 illustrate a first preferred embodiment of the present invention. In the first preferred embodiment of the present invention, the electrostatic actuator is applied to an optical switching device or other suitable optical device.

In these drawings, a substrate 1 is the base of the optical switching device. The substrate 1 is made of a glass plate or other suitable material having a substantially rectangular shape with a thickness of about several mm. The substrate 1 horizontally extends along the X and Y axial directions which are substantially perpendicular to each other.

A movable piece 2, a mirror 3, supporting beams 4, stationary electrodes 5, movable electrodes 8 are provided on the front surface of the substrate 1 and are formed by etching a silicon material or other suitable material having a low resistance.

Figure 2:
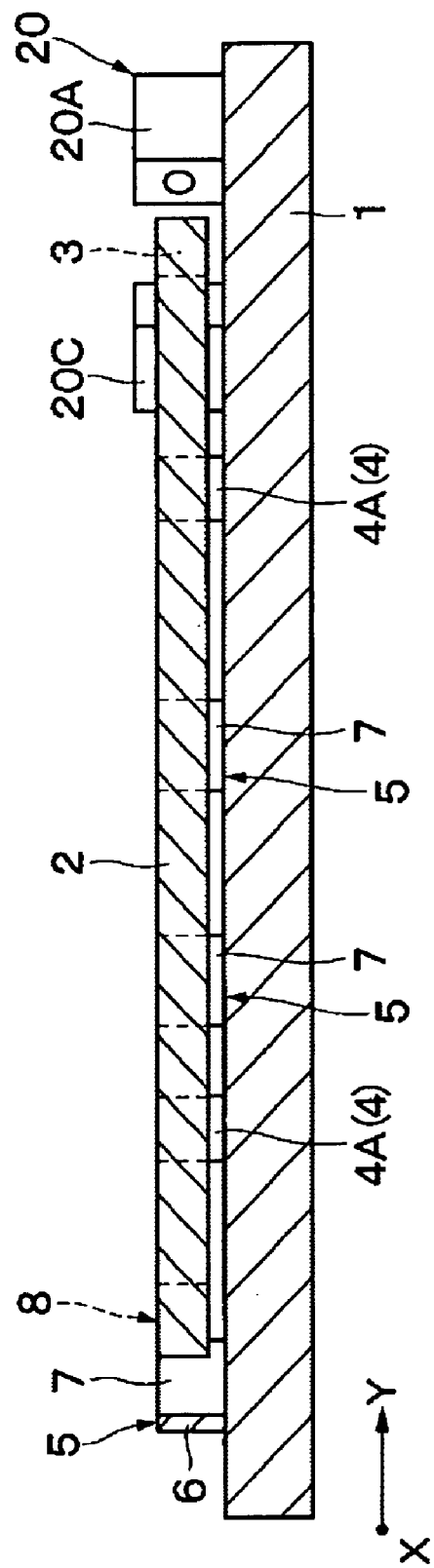
FIG. 2 is a sectional view of the optical switching device taken along the line II—II in FIG. 1.

The movable piece 2 is preferably a rod that is elongated in the Y-axial direction as shown in FIGS. 1 and 2. The movable piece 2 is supported in the Y-axial direction on the substrate 1 by the respective supporting beams 4. The movable piece 2, the mirror 3, and the movable electrodes 8 are supported at a distance above the substrate 1 as shown in FIG. 2.

The mirror 3 is provided on one end of the movable piece 2. The mirror 3 is arranged in such a manner that it advances or recedes into an optical path of the optical device 23. Thus, the optical paths can be switched over. A metallic film is formed on the surface of the mirror 3 by plating, evaporation, sputtering, or other suitable process. Thus, the surface is mirror-finished.

Figure 5:
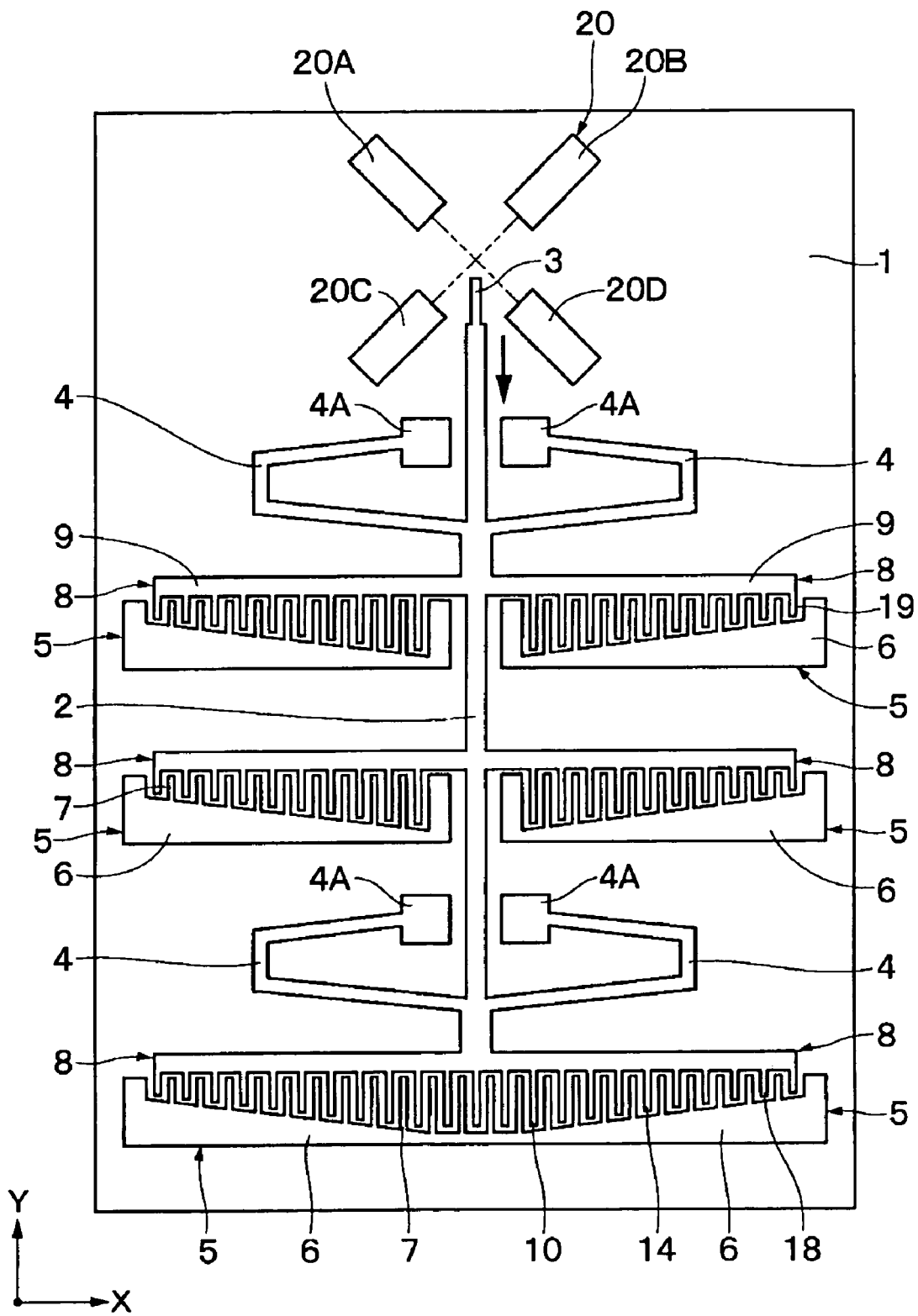
FIG. 5 is a plan view of the optical switching device of FIG. 1 in the switching-over position.

As shown in FIG. 1, when no voltage is applied across the stationary electrodes 5 and the movable electrodes 8, the mirror 3 is held in its initial position together with the movable piece 2 due to the elastic forces (spring force) of the supporting beams 4. As shown in FIG. 5, when a voltage is applied across the stationary electrodes 5 and the movable electrodes 8, electrostatic forces are generated between them so that the movable piece 2, the mirror 3, and the movable electrodes 8 are displaced in the Y-axial direction. Simultaneously, the supporting beams 4 are deflected. Thereby, the mirror 3 is moved to the switching-over position, and thus, the optical paths of the optical device 20 are switched over.

The supporting beams 4, of which there is preferably four, provided on the substrate 1 are preferably bent in a substantially U-character shape and can be deflected in the Y-axial direction. Moreover, a fixed portion 4A is provided on one end of each supporting beam 4 and is fixed to the substrate 1 by anodic bonding or other suitable method. The top end of the supporting beam 4 is securely joined to the movable piece 2. The supporting beams 4 are positioned preferably on the right and left sides of the movable piece 2. The supporting beams 4 are separated from each other in the advancing-receding direction. The movable piece 2 is supported by these four supporting beams 4 and can be displaced in the Y-axial direction.

The stationary electrodes 5, of which there are preferably six, are provided on the substrate 1. Each of the stationary electrodes 5 is preferably made of a silicon material or the suitable material having a low resistance. The stationary electrodes 5 are preferably arranged in a comb-like pattern. Each stationary electrode 5 includes a supporting portion 6 and stationary-side electrode plates 7. Three electrode plates are arranged on the right side of the line defined by the movable piece 2, and the remaining three are arranged on the left-side of the line defined by the movable piece 2. Thus, the stationary electrodes 5 are arranged symmetrically with respect to the movable piece 2 as a center line (line symmetry).

The supporting portions 6, of which the number is, e.g., six, are disposed in the stationary electrodes 5, respectively. The supporting portions 6 are arranged on the substrate 1 so as to have a constant height therefrom, are extended in the X-axial direction, and support the stationary-side electrode plates 7. Of the supporting portions 6, the two supporting portions 6 positioned on the end side (the back-side end) of the movable piece 2 are connected to each other.

Figure 7:
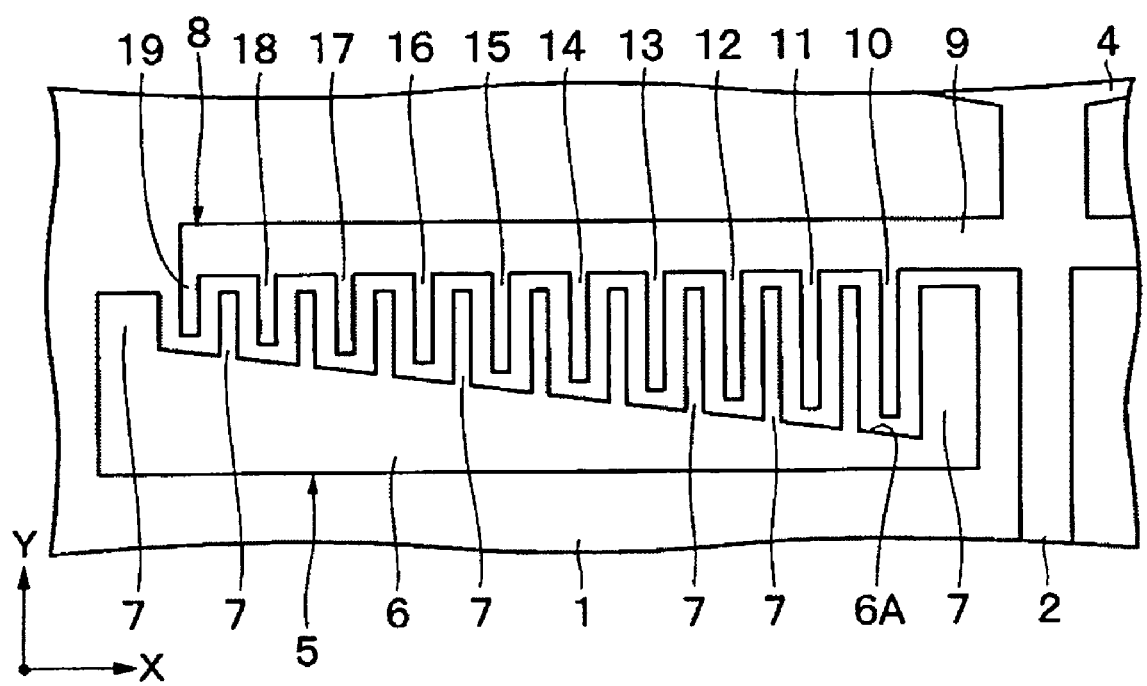
FIG. 7 is an enlarged plan view of the stationary electrode and the movable electrode shown in FIG. 3 in the final switched-over position.

The side surface of each supporting portion 6, which faces movable electrode 8, is preferably sloped with respect to the X-axial direction. That is, an inclined surface portion 6A is preferably provided. As seen in FIG. 7, when each movable electrode 8 is displaced by an electrostatic force, the inclined surface portions 6A are positioned relatively near to the ends of the movable-side electrode plates 10 to 19 of the movable electrode 8. Accordingly, electrostatic forces are also generated between the ends of the movable-side electrode plates 10 to 19 and the supporting portions 6.

A plurality of stationary-side electrode plates 7 of each stationary electrode 5 and are provided on the substrate 1 and the supporting portion 6. The stationary-side electrode plates 7 are preferably arranged at regular intervals in the X-axial direction in a comb-like pattern. In this case, the respective stationary-side electrode plates 7 extend from the supporting portion 6 toward the movable-side electrode plates 10 to 19 in the Y-axial direction (the direction in which the movable piece 2 is displaced) and have a substantially constant height from the substrate 1 in the direction vertical to the substrate 1. Thus, each stationary-side electrode plate 7 preferably has a substantially rectangular flat plate shape which is extended in the above-mentioned two directions. Moreover, the ends of each electrode plate 7 of the stationary electrode 5 are arranged to have equal lengths in the Y-axial direction.

Referring to the electrode plate 7 positioned at the left-end in the X-axial direction of the stationary-side electrode plates 7, an electrostatic force in the right direction is applied from the movable-side electrode plate 19 to the stationary-side electrode plate 7 positioned at the left end, when the stationary electrode 5 and the movable electrode 8 are meshed with each other, as shown in FIG. 7. An electrostatic force in the left direction is applied from the movable-side electrode plate 10 to the stationary-side electrode plate 7 positioned at the right end in the X-axial direction. The electrostatic forces in the opposite directions are applied to the other stationary-side electrode plates 7 from the movable-side electrode plates 10 to 19 which are meshed with the stationary-side electrode plates 7 on the right and left sides of the respective electrode plates 7. Thus, the electrostatic forces in the X-axial direction are cancelled out, so that the total electrostatic force in the X-axial direction becomes relatively small.

The widths of the two stationary-side electrode plates 7 positioned at the right and left ends in the X-axial direction are set at large values. Thereby, the stationary-side electrode plates 7 positioned at both ends have a high strength and can be bonded to the substrate 1 in a large area thereof by anodic bonding or other suitable process. Thus, the electrode plates 7 positioned at both ends are prevented from being deflected by an electrostatic force exerted from one side in the X-axial direction.

The movable electrodes 8, of which there are preferably 6, are provided on the movable piece 2 in opposition to the stationary electrodes 5. The movable electrodes 8 are preferably made of a silicon material or suitable material with a low resistance and are arranged in a comb-like electrode pattern. Each movable electrode includes a supporting portion 9 and the movable-side electrode plates 10 to 19 which will be described below. Moreover, three of the movable electrodes 8 are arranged on the right side of the line defined by the movable piece 2, and the remaining three are arranged on the left side of the line defined by the movable piece 2. Thus, the movable electrodes 8 are arranged on the right and left sides of the movable piece 2 as the center line to form a symmetrical pattern (line symmetry).

There are preferably six supporting portions 9. The supporting portion 9 preferably has a rod shaped configuration which extends from the movable piece 2 in the X-axial direction.

The plural movable-side electrode plates 10 to 19 of each movable electrode 8 extend from the supporting portion 9 toward the stationary-side electrode plates 7 in the Y-axial direction. The movable-side electrode plates 10 to 19 have a substantially constant height from the substrate 1 in the direction vertical to the substrate 1 and have a substantially rectangular flat plate shape which is extended in the Y-axial and the vertical direction. The movable-side electrode plates 10 to 19 are preferably arranged at regular intervals in the X-axial direction which are equal to those of the stationary-side electrode plates 7 and are preferably arranged in the X-axial direction in a comb-like pattern.

Figure 3:
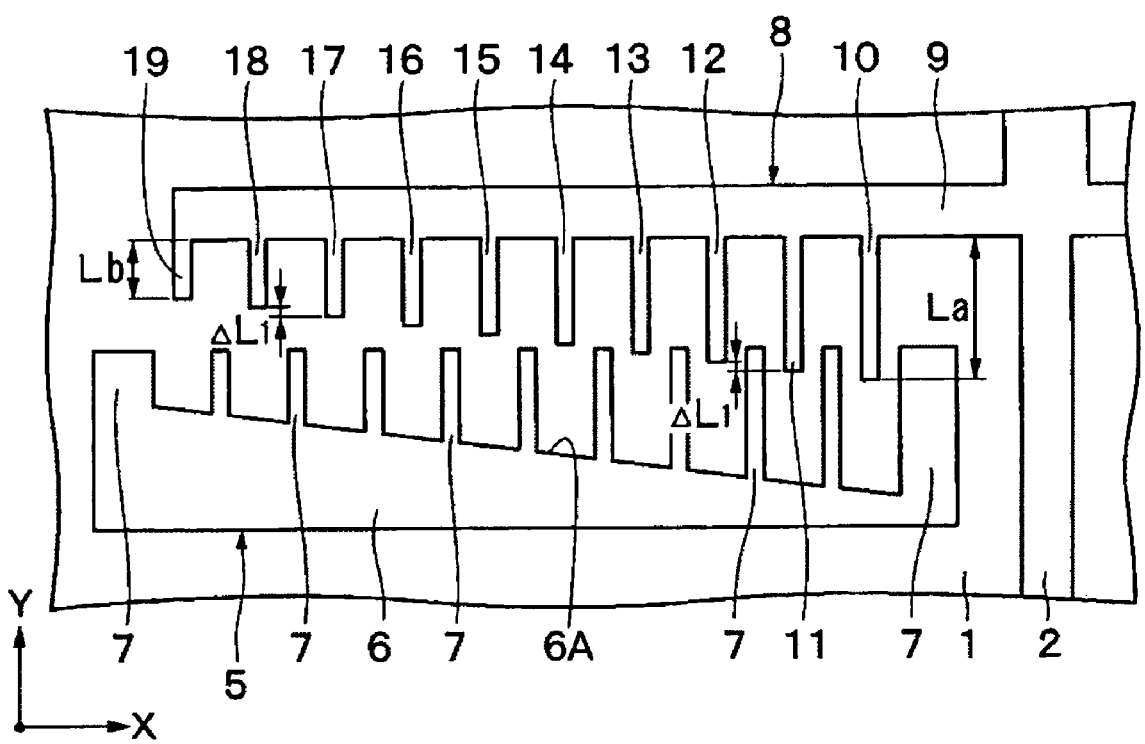
FIG. 3 is an enlarged plan view of the stationary electrode and the movable electrode shown in FIG. 1.

The electrode plate 10 nearest to the movable piece 2 has a length La in the Y-axial direction as shown in FIG. 3. The electrode plate 19 farthest from the movable piece 2 has a length Lb in the Y-axial direction which is smaller than the length La (La>Lb). Moreover, the movable-side electrode plates 10 to 19 are preferably formed such that the lengths of the electrode plates are changed stepwise in order from the electrode plate nearest to the movable piece 2 to the electrode plate farthest from the movable piece 2. In particular, the lengths are stepwise decreased by a length-difference $\Delta L_1$ of about 1 µm to about 10 µm for the respective electrode plates in order from the movable-side electrode plate 10 to the movable-side electrode plate 19.

Figure 4:
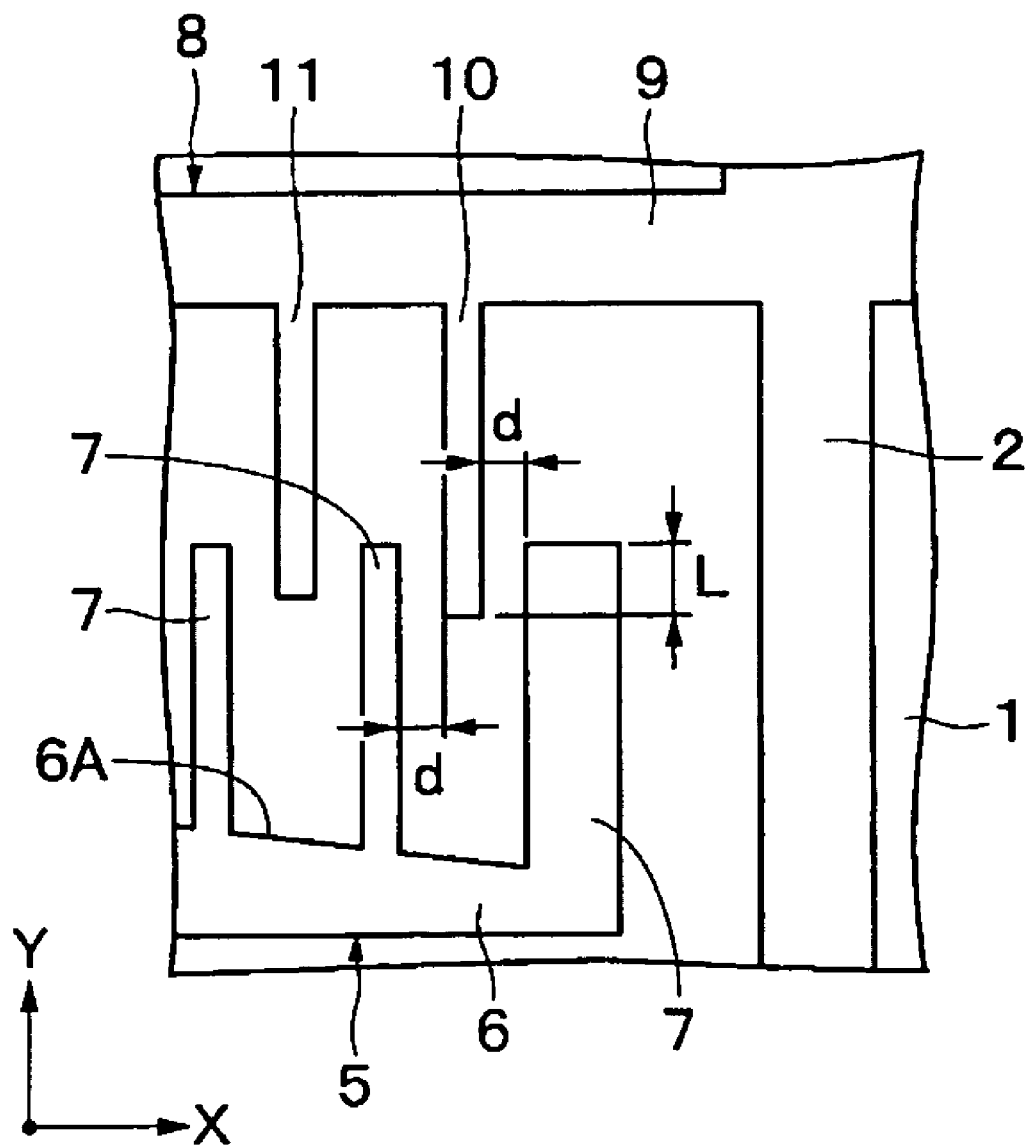
FIG. 4 is an enlarged plan view of the stationary electrode plates and the movable electrode plates of FIG. 3.

When the movable piece 2 is in its initial position, a part of the movable-side electrode plates 10 to 19 relatively near to the movable piece 2 (e.g., electrode plates 10 to 13) are meshed with the corresponding stationary-side electrode plates 7 in the middle positions between them. Thus, the electrode plates overlap the electrode plates 7 in the Y-axial direction. In this case, the size of the movable-side electrode plate 10 is preferably set at a value such that it overlaps the stationary-side electrode plate 7 over a length L of about 1 µm to about 10 µm as shown in FIG. 4. Moreover, an interval d in the X-axial direction of about 1 µm to about 5 µm is provided on the right and left sides of each of the electrode plates 10 to 13 between the movable-side electrode plates 10 to 13 and the corresponding stationary-side electrode plates 7. The other movable-side electrode plates (movable-side electrode plates 14 to 19) are preferably arranged such that that the electrode plates do not overlap (the overlapping length is zero) the stationary-side electrode plates 7.

Figure 6:
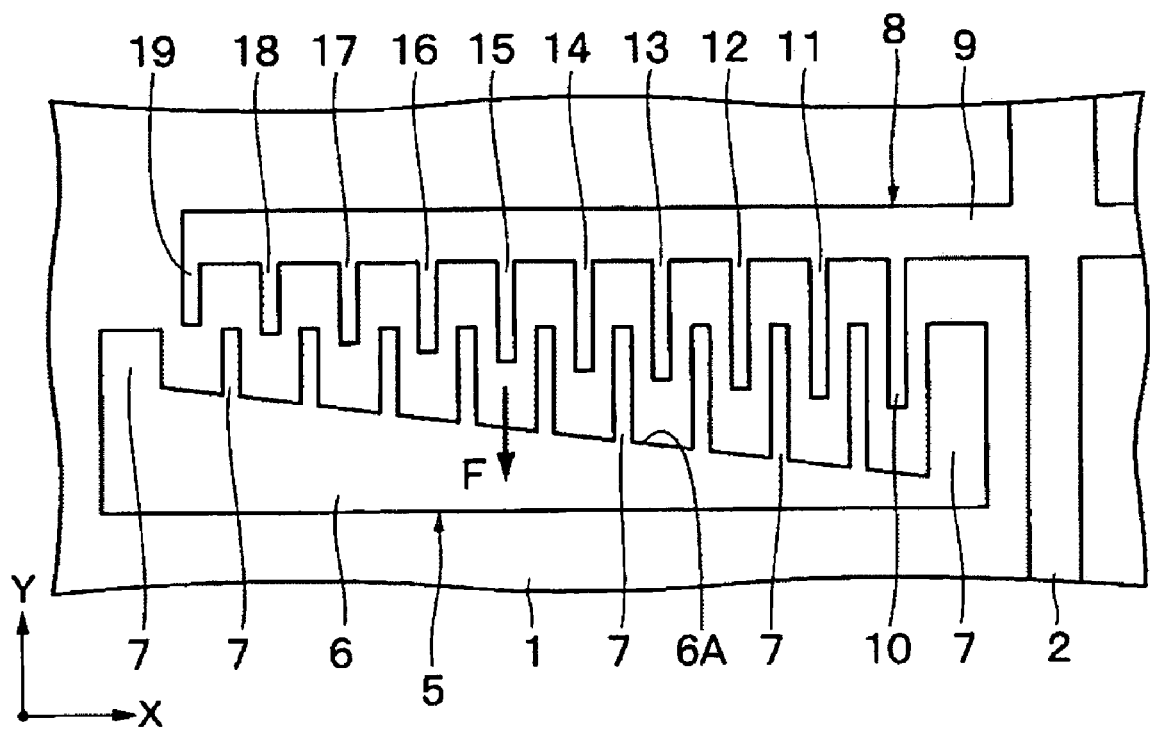
FIG. 6 is an enlarged plan view of the stationary electrode and the movable electrode shown in FIG. 3 in a switching-over position.

To drive the movable piece 2 to the final switched-over position, a DC voltage of about 50 V to about 100 V is preferably applied across the stationary electrodes 5 and the movable electrodes 8. Thereby, as shown in FIGS. 6 and 7, which will be described below, the movable-side electrode plates 10 to 19 are sequentially meshed with the stationary-side electrode plates 7 by electrostatic forces. The electrostatic forces generated between the electrodes 5 and 8 are gradually increased to exceed the restoring forces (reaction force) of the supporting beams 4. Therefore, the movable piece 2 is preferably displaced by a large amount of about 50 µm to about 80 µm to the final switched-over position.

As described above, the movable-side electrode plates 10 to 19 are formed so that the lengths thereof are stepwise decreased. Accordingly, the sum of the overlapping lengths of the movable-side electrode plates 10 to 19 and the stationary-side electrode plates 7 when the movable piece 2 is displaced can be kept at a necessary and small value. Thus, the electrostatic forces acting on the movable piece 2 in the X-axial direction, generated due to dispersions in the sizes of the electrode plates 7, 10 to 19, can be suppressed.

An optical device 20, provided on the substrate 1, includes light-emitting members 20A and 20B and light-receiving members 20C and 20D as shown in FIGS. 1 and 5. Optical fibers or other suitable optical devices (not shown) are connected to these members. When the movable piece 2 is in its initial position, a light beam emitted from the light-emitting member 20A is reflected by the mirror 3, and is received by the light receiving member 20C. A light beam from the light-emitting member 20B is received by the light-receiving member 20D. When the movable piece 2 is in the final switched-over position, a light beam from the light-emitting member 20A is transmitted outside the mirror 3 and is received by the light-receiving member 20D. A light beam from the light-emitting member 20B is received by the light-receiving member 20C.

Hereafter, the operation of the optical switching device according to this first preferred embodiment of the present invention will be described.

First, a voltage is applied across the stationary electrodes 5 and the movable electrodes 8. Electrostatic forces are generated between the movable-side electrode plates 10 to 13 and the stationary-side electrode plates 7. Then, an electrostatic force F in the Y-axial direction applied to the movable electrodes 8 can be expressed by the following formula 1:

$$F = (\epsilon \times h \times V^2 \times n)/d$$

where $\epsilon$ is a dielectric constant, h is the height of an electrode plate in the direction vertical to the substrate 1, d is an interval in the X-axial direction between electrode plates, and n is the number of electrode plates meshed with each other.

Not only are electrostatic forces in the Y-axial direction but also the electrostatic forces in the X-axial direction are applied to the overlapping portions of the movable-side electrode plates 10 to 13 and the corresponding stationary-side electrode plates 7. However, the electrostatic forces in the X-axial direction applied to the movable-side electrode plates 10 to 13 are cancelled out because the intervals d between the movable-side electrode plates 10 to 13 and the stationary-side electrode plates 7 positioned on both of the sides thereof, respectively, are equal to each other as shown in FIG. 4. Thus, only the electrostatic force F in the Y-axial direction is applied to the movable-side electrode plates 10 to 13.

Then, the movable piece 2 is displaced in the Y-axial direction by the electrostatic force F, as shown in FIG. 6, and simultaneously, the supporting beams 4 is deflected. Thus, the movable piece 2 is subjected to the restoring force (reaction force) depending on the deflection of the supporting beams 4. However, according to the first preferred embodiment of the present invention, the movable-side electrode plates 10 to 19 are formed so that the lengths thereof are stepwise decreased. Thus, when the movable piece 2 is displaced, the movable-side electrode plates 14 to 19 are sequentially meshed with the corresponding stationary-side electrode plates 7 in correspondence to the displacement. The number n in the numerical formula 1 corresponds to the number of the meshed electrodes. Therefore, the electrostatic force F in the Y-axial direction applied to all of the movable electrodes 8 is gradually increased correspondingly to the displacement of the movable piece 2, as shown by the solid line in FIG. 8. The electrostatic force F has a value slightly larger than the restoring force F' of the supporting beam 4, i.e., the necessary and smallest value at which the movable piece 2 can be driven.

Figure 8:
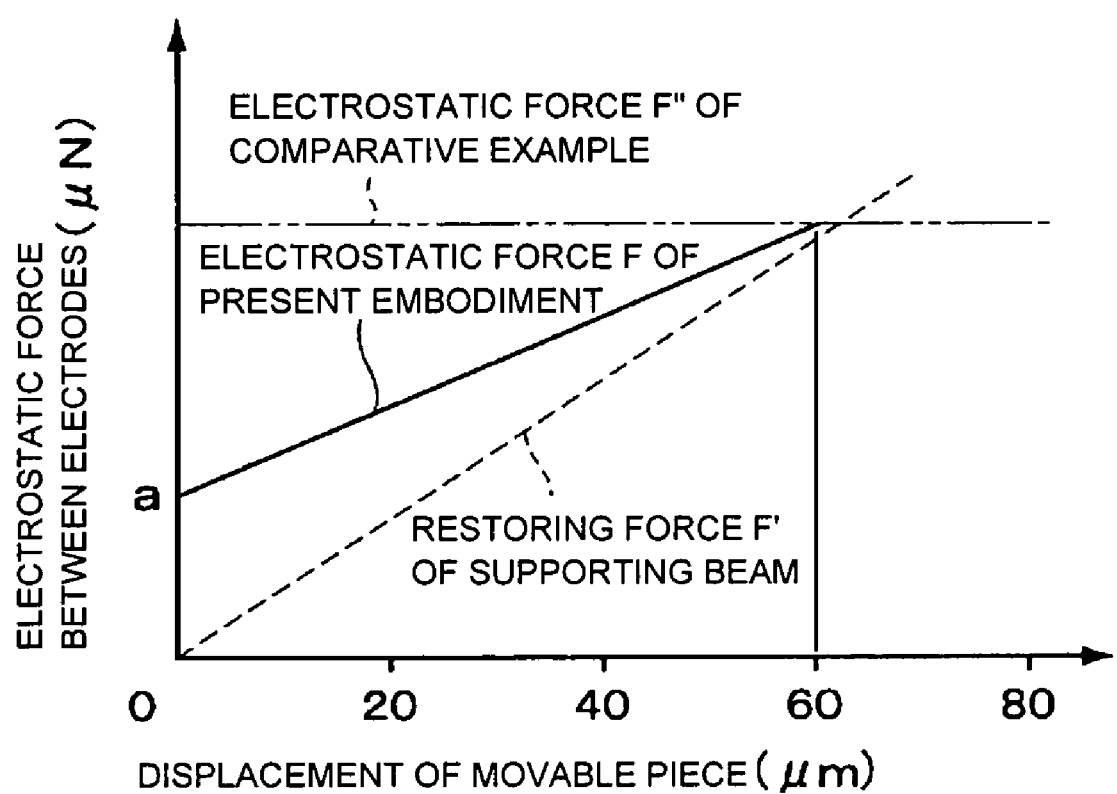
FIG. 8 is a characteristic curve illustrating a relationship between the displacement of the movable piece and the inter-electrode electrostatic force.
Figure 9:
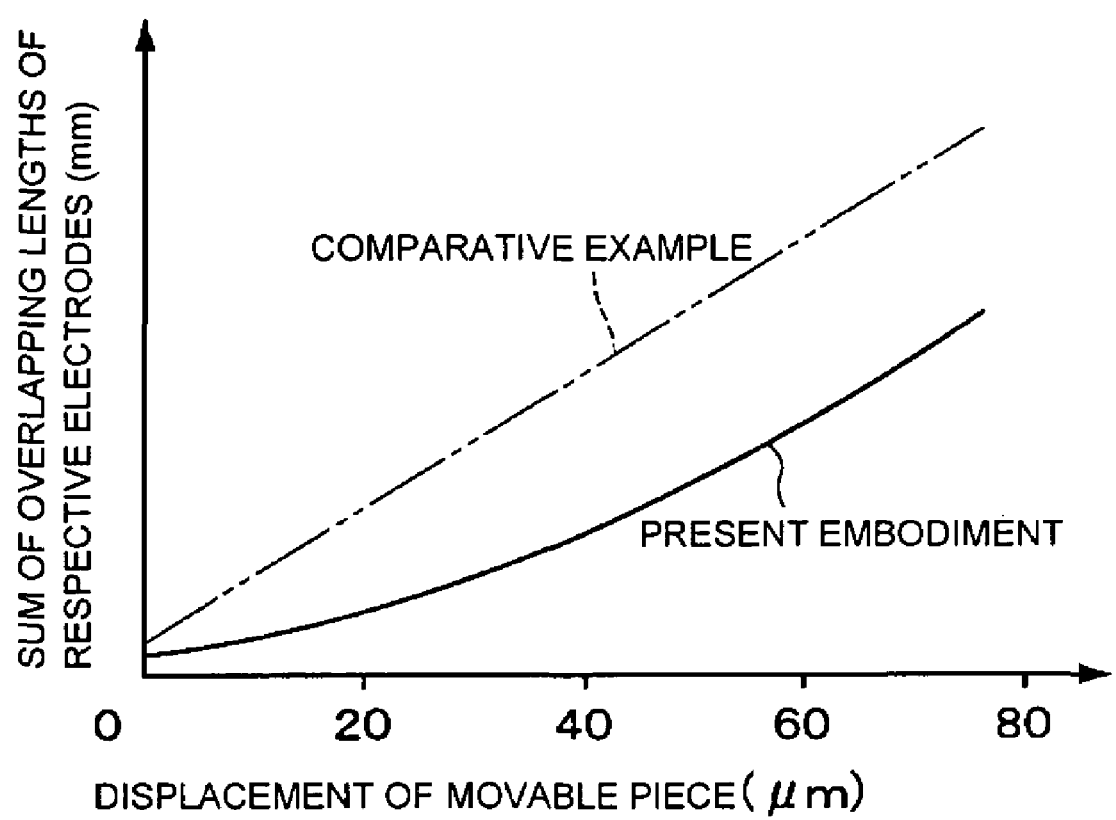
FIG. 9 is a characteristic curve illustrating a relationship between the displacement of the movable piece and the total overlapping length of the respective electrodes.

The electrostatic force F between the electrodes 5 and 8 and shown by the solid line in FIG. 8 is set in such a manner that the solid line has an intercept a, at the initial position of the movable piece 2 (where the displacement is zero). The intercept a is determined by the number of electrode plates (e.g., the movable-side electrode plates 10 to 13 and the stationary-side electrode plates 7) meshed with each other at the initial position. The intercept a is increased with the number of the electrode plates which are meshed at the initial position.

According to the first preferred embodiment of the present embodiment as shown in FIG. 8, the gradient of the electrostatic force F based on the displacement of the movable piece 2 is set to be smaller than the gradient of the restoring force F' of the supporting beams 4. Accordingly, if the maximum displacement required for the movable piece 2 is set to approximately 60 µm, the electrostatic force F is required to be larger than the restoring force F' in the range of up to the maximum displacement of approximately 60 µm.

Accordingly, if the supporting beams 4 are formed with more flexible springs, the gradient of the restoring force F' can be set to a smaller value compared to the gradient of the restoring force F' as shown in FIG. 8. If the gradient of the electric force F between the electrodes 5 and 8 is set at relatively large values, the number of electrode plates meshed with each other in the initial position can be reduced. Thereby, the intercept a of the electrostatic force F can be small.

The movable piece 2, which is displaced as described above, is displaced in the Y-axial direction until all of the movable-side electrode plates 10 to 19 are meshed with the stationary-side electrode plates 7, as shown in FIG. 7, and the electrostatic force F between the electrodes 5 and 8 equals the restoring force F' of the supporting beams 4. Then, the movable piece 2 reaches the final switched-over position.

Figure 10:
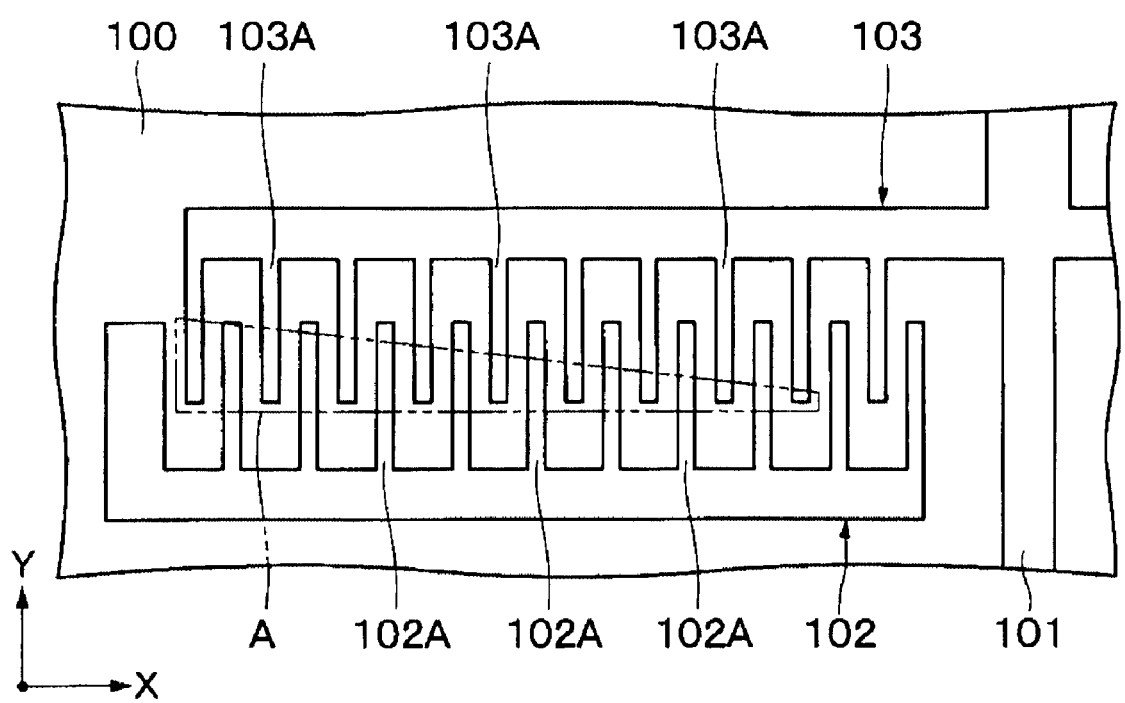
FIG. 10 is an enlarged plan view of a conventional example.

Hereafter, a comparative example of an electrostatic actuator shown in FIG. 10 will be described. In the comparative example, a movable piece 101 and a stationary electrode 102 are provided on a substrate 100. A movable electrode 103 is provided on the movable piece 101. A plurality of stationary-side electrode plates 102A having equal lengths are arranged in a comb-like pattern. A plurality of movable-side electrode plates 103A having equal lengths are arranged in a comb-like pattern.

The electrode plates 102A and 103A are already meshed with each other in their initial state. Thus, an electrostatic force F''' in the Y-axial direction generated between the electrodes 102 and 103 is substantially constant with respect to the displacement of the movable piece 101, as shown by an imaginary line in FIG. 8. The total overlapping length of the electrode plates 102A and the electrode plates 103A is increased in proportion to the displacement of the movable piece 101.

According to the first preferred embodiment of the present invention, the movable-side electrode plates 10 to 19 are sequentially meshed with the stationary-side electrode plates 7 in correspondence with the displacement of the movable piece 2. Therefore, when the displacement is small, these electrode plates 7 and 10 to 19 are prevented from excessively overlapping each other, as shown in an area A in FIG. 10. As a result, the total overlapping length of the movable-side electrode plates 10 to 19 and the stationary-side electrode plates 7 of the electrode 5 and 8 is reduced to about two thirds of the total overlapping length in known electrostatic type actuators, as shown by the solid line in FIG. 9.

Therefore, the portions of the movable-side electrode plates 10 to 19 over which an electrostatic force in the X-axial direction can be exerted can be reduced to the smallest possible amount. Thus, even if an electrostatic force in the X-axial direction remains, not cancelled out, the movable piece 2 is prevented from being displaced and inclined.

Thus, according to preferred embodiments of the present invention, the movable-side electrode plates 10 to 19 of each movable electrode 8 are formed to have different lengths. For example, the electrode plates 14 to 19 having smaller lengths can be arranged so as not to be meshed with the corresponding stationary-side electrode plates 7 in the initial position.

To drive the movable piece 2, electrostatic forces are generated between the electrode plates 10 to 13 having large lengths and the corresponding stationary-side electrode plates 7. The movable piece 2 is displaced by the electrostatic forces. Then, the movable-side electrode plates 14 to 19 having smaller lengths are sequentially meshed with the corresponding stationary-side electrode plates 7 in correspondence with the displacement of the movable piece 2.

Thus, the electrostatic force generated between the stationary electrode 5 and the movable electrode 8 can be gradually increased. Thus, the movable piece 2 can be largely displaced until all of the movable-side electrode plates 10 to 19 are meshed with the stationary-side electrode plates 7. Moreover, in every position of the movable piece 2, the total overlapping length of the movable-side electrode plates 10 to 19 and the stationary-side electrode plates 7 is reduced to the necessary and smallest value.

Accordingly, the electrode plates 102A and 103A are prevented from overlapping each other in the not-required portion A, in contrast to electrostatic type actuators of a known technique. Thus, electrostatic forces in the X-axial direction generated when the electrode plates 7 and 10 to 19 overlap each other are reduced to be the smallest possible. As a result, the movable piece 2, the mirror 3, and the movable electrodes 8 are stably displaced in the Y-axial direction in actuators such as optical switching devices or suitable optical devices for which a large displacement is required. Thus, the movable piece 2, the mirror 3, and the movable electrodes 8 are prevented from being inclined which may be caused by the electrostatic forces in the X-axial direction, and the reliability of the actuator is enhanced while a sufficient displacement is achieved.

In contrast to conventional electrostatic type actuators, an electrostatic force excessively higher than the reaction force of the supporting beams 4 is not generated. An electrostatic force F slightly larger than the reaction force of the supporting beams 4 is easily generated. Accordingly, the movable piece 2 can be efficiently driven while the functions of the electrodes 5 and 8 are maintained.

Moreover, the movable-side electrode plates 10 to 19 are formed such that the lengths are stepwise changed. Thus, the length-difference $\Delta L_1$ between adjacent electrode plates 10 to 19 can be set at a small value. When the stationary-side electrode plate 7 is meshed with one set of movable-side electrode plates (for example, electrode plates 10 and 11), the electrostatic forces in the X-axial direction are well balanced. Therefore, a large difference in the electrostatic forces applied in the X-axial direction caused by a difference in size of the movable-side electrode plates 10 and 11 is prevented. Thus, the stationary-side electrode plate 7 is prevented from being deflected and inclined with respect to the X-axial direction.

Moreover, the movable-side electrode plates 10 to 19 are formed such that the farther the movable-side electrode plate is positioned from the movable piece 2, the smaller the length of the electrode plate is. Accordingly, the stationary-side electrode plates 7 and the movable-side electrode plates 10 to 19 are formed such that the farther the electrode plates are positioned from the movable piece 2, the smaller the overlapping length is. Accordingly, even if such an electrostatic force tends to incline the movable piece 2, the electrostatic force is prevented from generating a large rotational moment at the final switched-over position farther from the movable piece 2. Thus, the movable piece 2 can be stably driven in the Y-axial direction.

Moreover, because the lengths of the movable-side electrode plates 10 to 19 are small, the weight of the whole of the movable unit including the movable piece 2, the mirror 3, and the movable electrodes 8 is reduced. Accordingly, when the movable unit is displaced to the final switched-over position or is recovered to its initial position by the restoring force of the supporting beams, this electrostatic actuator has greatly improved reliability. Thus, the optical switching device carries out the switching-over without problems.

Figure 11:
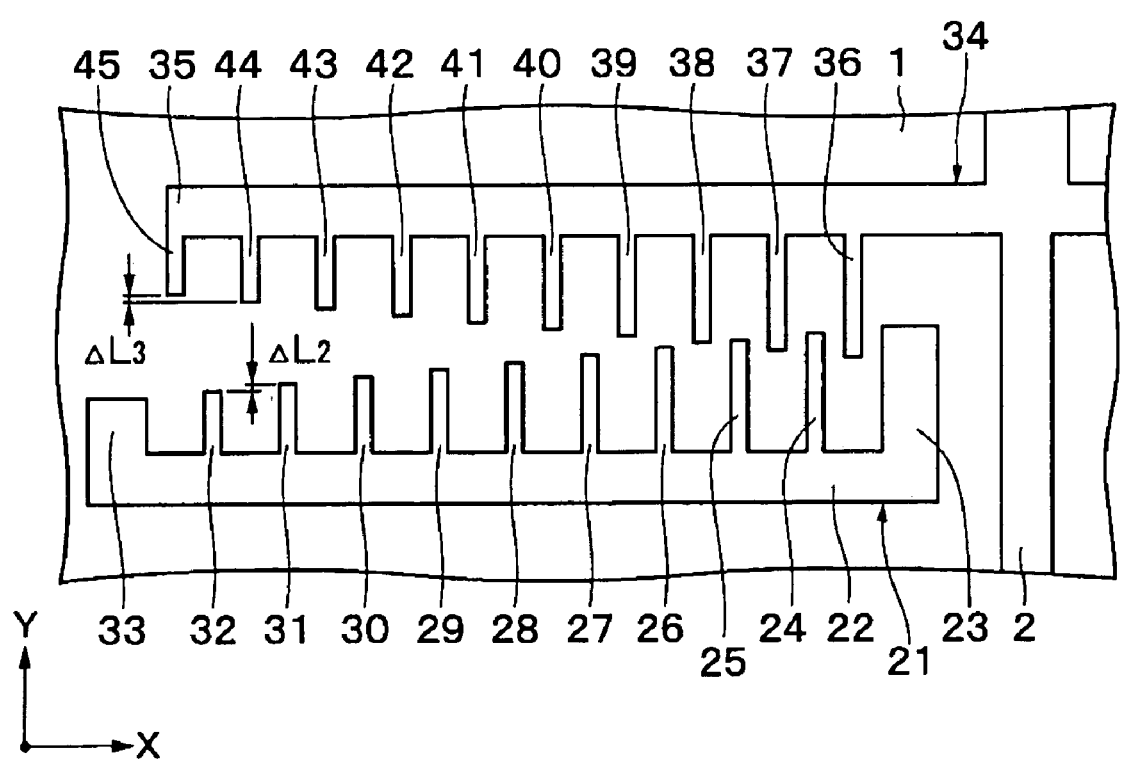
FIG. 11 is an enlarged plan view of an optical switching device according to a second preferred embodiment of the present invention.

FIG. 11 illustrates a second preferred embodiment of the present invention. According to the second preferred embodiment of the present invention, the electrode plates of the stationary electrodes and the movable electrodes have different lengths. The components of the second preferred embodiment of the present invention which are the same or equivalent to those of the first preferred embodiment are designated by the same reference numerals, and the description thereof is not repeated.

A stationary electrode 21 is provided on the substrate 1 similarly to the stationary electrode of the first preferred embodiment of the present invention. The stationary electrode 21 includes a supporting portion 22 extended in the X-axial direction and stationary-side electrode plates 23 to 33 which will be described below.

The plural stationary-side electrode plates 23, 24, 25, 26, 27, 28, 29, 30, 31, 32, and 33 extend in the Y-axial direction from the supporting portion 22 toward movable-side electrode plates 36 to 45, which will be described below, and are arranged at regular intervals in the X-axial direction in a comb-like pattern.

Of the stationary-side electrode plates 23 to 33, the electrode plate 23 nearest to the movable piece 2 has the longest length, while the electrode plate 33 farthest from the movable piece 2 has the smallest length. The stationary-side electrode plates 23 to 33 are formed such that the lengths thereof are stepwise changed in order from the electrode plate 23 nearest to the movable piece 2 to the electrode plate 33 farthest from the movable piece 2. In particular, the lengths are decreased stepwise by a predetermined length-difference $\Delta L_2$ for the respective electrode plates.

A movable electrode 34 is provided on the movable piece 2 in opposition to the stationary electrode 21. The movable electrode 34 includes a supporting portion 35 preferably has a rod-shaped configuration extended from the movable piece 2 in the X-axial direction and the movable-side electrode plates 36 to 45 which will be described below.

A plurality of the movable-side electrode plates 36, 37, 38, 39, 40, 41, 42, 43, 44, and 45 extend from the supporting portion 35 toward the stationary-side electrode plates 23 to 33 in the Y-axial direction. The movable-side electrode plates 36 to 45 are arranged in the X-axial direction at regular intervals, which are equal to those of the electrode plates 23 to 33 to form a comb-like pattern.

Of the movable-side electrode plates 36 to 45, the electrode plate 36 nearest to the movable piece 2 has the longest length in the Y-axial direction, while the electrode plate 45 farthest from the movable piece 2 has the smallest length. The movable-side electrode plates 36 to 45 are formed such that the lengths thereof are stepwise decreased in order from the electrode plate 36 to the electrode plate 45. That is, the lengths are stepwise decreased in the order of from the electrode plate 36 to the electrode plate 45 by a predetermined length-difference for the respective electrode plates.

In the initial position, the movable-side electrode plates 36 and 37 are meshed with the stationary-side electrode plates 23 and 24 and the other movable-side electrode plates 38 to 45 are not meshed with the stationary-side electrode plates 25 to 33.

The optical switching device of the second preferred embodiment of the present invention configured as described above has the same operation/effects as those of the first preferred embodiment. In particular, according to the second preferred embodiment of the present invention, the stationary-side electrode plates 23 to 33 and the movable-side electrode plates 36 to 45 are formed such that the lengths thereof are stepwise decreased in order from the electrode plate nearest to the movable piece 2 to the electrode plate farthest from the movable piece 2, respectively. Thus, length-differences $\Delta L_2$ and $\Delta L_3$ is provided for both of the stationary-side electrode plates 23 to 33 and the movable-side electrode plates 36 to 45, respectively.

Thereby, when the movable piece 2 is displaced by an electrostatic force, the overlapping lengths of the stationary-e side electrode plates 23 to 33 and the movable-side electrode plates 36 to 45 can be stepwise increased by the sum of the length-differences $\Delta L_2$ and $\Delta L_3$ for the respective electrode plates. Therefore, even if the length-differences $\Delta L_2$ and $\Delta L_3$ are set at a value equal to about half of the length-difference $\Delta L_1$ of the first preferred embodiment, the electrostatic force generated between the electrodes 21 and 34 can be sufficiently increased in correspondence to the displacement of the movable piece 2.

Thus, the length-differences $\Delta L_2$ and $\Delta L_3$ can be set to small values. When a movable-side electrode plate is meshed with the adjacent two stationary-side electrode plates, the electrostatic forces in the X-axial direction applied from the stationary-side electrode plates on both sides of the movable-side electrode plate are well balanced. Therefore, the inclination of the movable-side electrode plate 36 is prevented. Thus, the movable piece 2 is stably driven.

Figure 12:
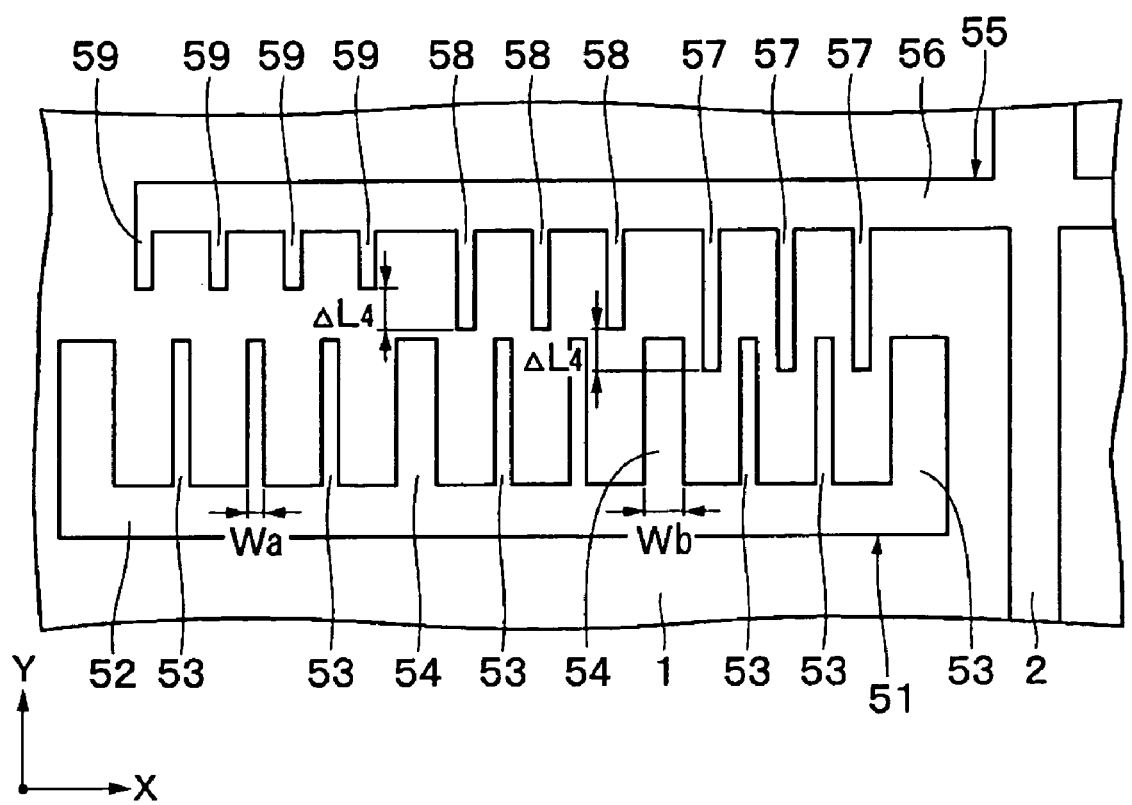
FIG. 12 is an enlarged plan view according to a third preferred embodiment of the present invention.

FIG. 12 illustrates a third preferred embodiment of the present invention. According to the third preferred embodiment of the present invention, the plurality of electrode plates define sets of electrode plates, where each set of electrode plates include electrode plates having equal lengths. The length of each set of electrode plates is different from the other sets of electrode plates. The components of the third preferred embodiment of the present invention which are the same or equivalent to those of the first preferred embodiment of the present invention are designated by the same reference numerals, and the description is not repeated.

A stationary electrode 51 is provided on the substrate 1, similar to the stationary electrode of the first preferred embodiment of the present invention. The stationary electrode 51 includes a supporting portion 52 extended in the X-axial direction and stationary-side electrode plates 53 and 54 which will be described below.

The stationary-side electrode plates 53 and 54 of the stationary electrode 51 extend in the Y-axial direction from the supporting portion 52 toward movable-side electrode plates 57 to 59, which will be described below. The stationary-side electrode plates 53 and 54 are arranged at regular intervals in the X-axial direction in a comb-like pattern, similar to those in the first preferred embodiment of the present invention.

The stationary-side electrode plates 53 are moved into the spaces between the electrode plates 57 (having the same lengths), between the electrode plates 58 (having the same lengths), and between the electrode plates 59 (having the same lengths) for meshing, respectively. The stationary-side electrode plates 53 have a predetermined width Wa in the X-axial direction.

The stationary-side electrode plates 54 are moved into the space between the sets of electrode plates having different lengths. Therefore, the electrostatic forces that are applied to the stationary-side electrode plate 54 from the movable-side electrode plates 57 and 58 (or the movable-side electrode plates 58 and 59) on the right and left sides of the electrode plate 54 are different from each other because of a length-difference $\Delta L_4$ which will be described below. Therefore, the stationary-side electrode plates 54 have a width Wb larger than the width Wa of the stationary-side electrode plates 53 (Wa<Wb). Thus, the stationary-side electrode plates 54 have a higher strength, and therefore, even if an electrostatic force in the X-axial direction is applied, the stationary-side electrode plates 54 are prevented from being deflected.

A movable electrode 55 is provided on the movable piece 2 in opposition to the stationary electrode 51. Similar to the movable electrode in the first preferred embodiment of the present invention, the movable electrode 55 includes a supporting portion 56 preferably having a rod shaped configuration extended from the movable piece 2 in the X-axial direction and movable-side electrode plates 57, 58, and 59, which will be described below.

The movable-side electrode plates 57, 58, and 59 of the movable electrode 55 are extended in the Y-axial direction from the supporting portion 56 toward the stationary-side electrode plates 53 and 54 and are arranged in the X-axial direction at substantially regular intervals in a comb-like pattern.

The movable-side electrode plates 57, 58, and 59 preferably define three sets of electrode plates. Each set of electrode plates have equal lengths. That is, the set of three electrode plates 57 positioned near the movable piece 2 has equal lengths in the Y-axial direction; the set of three electrode plates 58 more distant from the movable piece 2 than the electrode plates 57 has equal lengths in the Y-axial direction; and the set of four electrode plates 59 more distant from the movable piece 2 than the electrode plates 58 has equal lengths in the Y-axial direction.

Moreover, for the movable-side electrode plates 57, 58, and 59, the length of the electrode plates of one set is different from the length of the electrode plates of the other sets. Furthermore, the length of the sets of electrode plates is stepwise decreased by a predetermined length-difference $\Delta L_4$ in order from the electrode plates 57 nearest to the movable piece 2 to the electrode plates 59 farthest from the movable piece 2.

When the movable piece 2 is in the initial position, the movable-side electrode plates 57 are moved into the space between the stationary-side electrode plates 53 and 54 to be meshed. The other movable-side electrode plates 58 and 59 are not meshed with the stationary-side electrode plates 53 and 54.

Therefore, according to this preferred embodiment of the present invention, the same operation and effects as those of the first preferred embodiment are obtained. Especially, according to this preferred embodiment of the present invention, the movable-side electrode plates 57, 58, and 59 define three sets which have different lengths. For example, when the movable piece 2 is displaced from the initial position to the switching-over position via an intermediate position, the numbers of the movable-side electrode plates 57, 58, and 59 to be meshed with the stationary-side electrode plates 53 and 54 can be set at different values. Thereby, an electrostatic force having a strength that is suitable for the position of the movable piece 2 can be generated. Thus, the design-flexibility is enhanced.

Moreover, the width Wb of the stationary-side electrode plates 54 is larger than the width Wa of the other stationary-side electrode plates 53. Thus, even if electrostatic forces in the X-axial direction are applied to each stationary-side electrode plate 64 from the electrode plates 57 and 58 on both sides of the electrode plate 64 and if the electrostatic forces have different strengths due to the length-difference $\Delta L_4$, the stationary-side electrode plate 54 is prevented from being deflected. Thus, the device is stably operated as an actuator.

Figure 13:
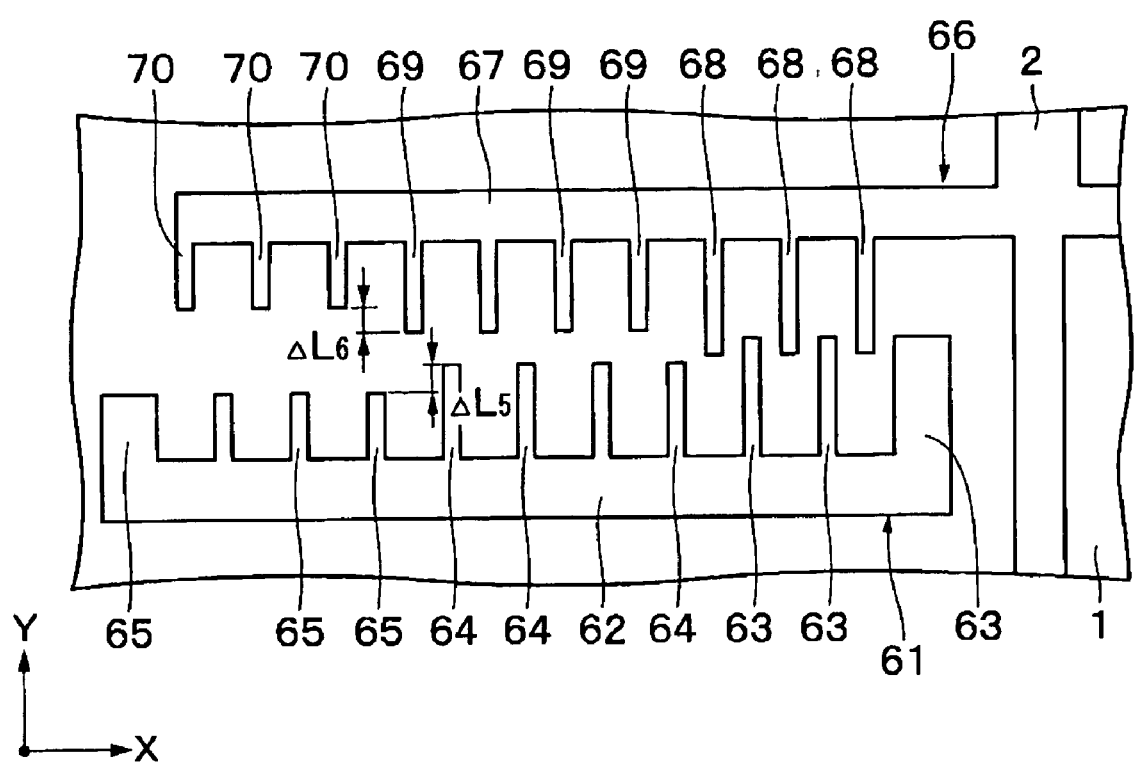
FIG. 13 is an enlarged plan view of an optical switching device according to a fourth preferred embodiment of the present invention.

FIG. 13 shows a fourth preferred embodiment of the present invention. According to the fourth preferred embodiment of the present invention, a plurality of electrode plates for both of the stationary electrode and the movable electrode define sets of plural electrode plates having equal lengths. The length for each set of electrode plates is different from the length of the other sets. The elements of this preferred embodiment of the present invention which are the same or equivalent to those of the above-described first preferred embodiment of the present invention are designated by the same reference numerals, and the description is not repeated.

A stationary electrode 61 is provided on a substrate 1, and includes a supporting portion 62 extended in the X-axial direction and stationary-side electrode plates 63, 64, and 65 which are described below.

The electrode plates 63, 64, and 65 of the stationary electrode 61 extend in the Y-axial direction from the supporting portion 62 toward the below-described movable-side electrode plates 68 to 70 and are arranged at substantially regular intervals in the X-axial direction in a comb-like pattern.

The stationary-side electrode plates 63 and 65 define three sets of electrode plates having equal lengths. In particular, the set of three electrode plates 63 near the movable piece 2 has equal lengths in the Y-axial direction; the set of four electrode plates 64 farther from the movable piece 2 than the electrode plates 63 has equal lengths in the Y-axial direction; and the set of three electrode plates 65 farther from the movable piece 2 than the electrode plates 64 has equal lengths in the Y-axial direction.

The lengths of the stationary-side electrode plates 63 to 65 are different for different sets. The lengths of these electrodes 63 to 63 are stepwise decreased in order from the electrode plate 63 nearest to the movable piece 2 to electrode plate 65 farthest from the movable piece 2 by a predetermined length-difference $\Delta L_5$ for the respective electrode plates.

A movable electrode 66 is provided on the movable piece 2 and is positioned in opposition to the stationary electrode 61. The movable electrode 66, similar to those in the first preferred embodiment of the present invention includes a supporting portion 67 preferably having a rod-shape and projected from the movable piece 2 in the X-axial direction and movable-side electrode plates 68, 69, and 70 which will be described below.

The plural movable-side electrode plates 68, 69, and 70 of the movable electrode 66 extend from the supporting portion 67 toward the stationary-side electrode plates 63, 64, and 65 in the Y-axial direction and are arranged at substantially regular intervals in the X-axial direction in a comb-like pattern. The substantially regular intervals are the same as those of the stationary-side electrode plates 63, 64, and 65.

Similar to the third preferred embodiment of the present invention, the movable-side electrode plates 68, 69, and 70 define three sets of electrode plates having equal lengths. That is, a set of three electrode plates 68 relatively near to the movable piece 2, a set of four electrode plates 69 farther from the movable piece 2 than the electrode plates 68, and a set of three electrode plates 70 farther from the movable piece 2 than the electrode plates 69. For the electrode plates 68 to 70, the lengths of the electrode plates in the Y-axial direction of the same set are equal to each other. The lengths of the movable-side electrode plates 68, 69, and 70 are different from each other and are stepwise decreased in the order of the electrode plates 68, 69, and 70 by a length-difference $\Delta L_6$ for the different sets.

According to this preferred embodiment of the present invention, the same operation and effects as those of the first to third preferred embodiments of the present invention can be obtained.

Figure 14:
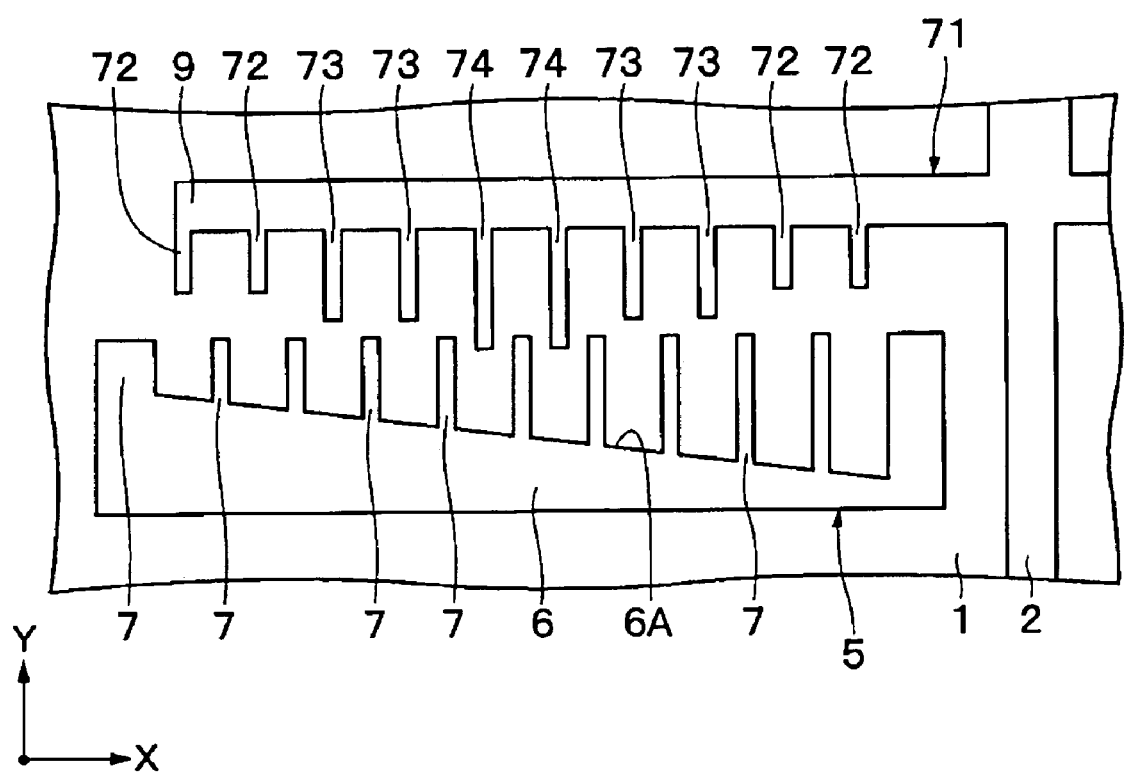
FIG. 14 is an enlarged plan view of an optical switching device according to a first modification of the preferred embodiments of the present invention.

In the above-described preferred embodiments of the present invention, the lengths of the electrode plates 10 to 19, 23 to 33, 36 to 45, 57 to 59, 63 to 65, and 68 to 70 are preferably stepwise changed in order from the electrode plates positioned nearest to the movable piece 2 to the positions of the electrode plates positioned farthest from the movable piece 2. However, the present invention is not restricted to this arrangement. For example, the stationary electrode and the movable electrode may have such a configuration as shown in a first modification of FIG. 14. The lengths of movable-side electrode plates 72, 73, and 74 of the movable electrode 71 are stepwise changed in a convex line from the electrode plate nearest to the movable piece 2 to the electrode plate farthest from the movable piece 2. That is, for the movable electrode 71, the electrode plates 72 nearest to the movable piece 2 and the electrode plates 72 farthest from the movable piece 2 have a smaller length, and the length of the electrode plate 74 provided in a middle position is larger. Moreover, the lengths of the electrode plates of the movable electrode 71 are stepwise increased from the electrode plates 72 provided on both of the side ends toward the electrode plates 74 provided in a middle position.

Figure 15:
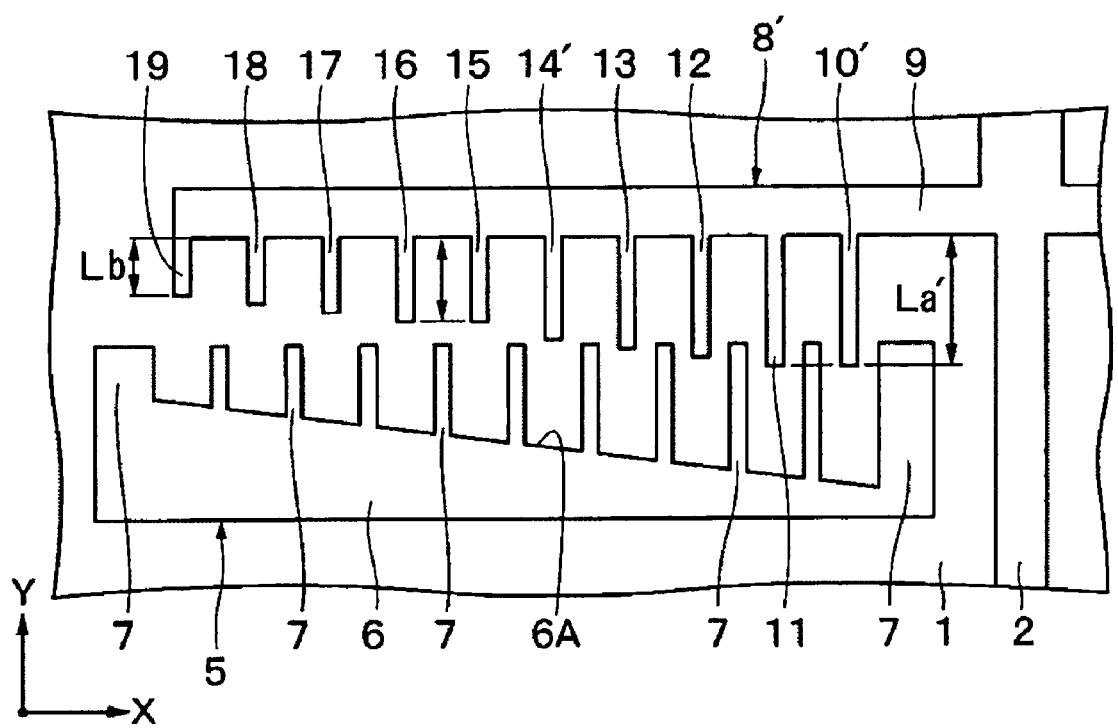
FIG. 15 is an enlarged plan view of an optical switching device according to a second modification of the preferred embodiments of the present invention.

Moreover, according to the first preferred embodiment of the present invention, the movable-side electrode plates 10 to 19 are different from each other by a length-difference $\Delta L_1$. However, according to the present invention, not all of the electrode plates are necessarily different from each other. For example, as seen in a second modification of the preferred embodiments of the present invention of FIG. 15, at least a part of a plurality of the electrode plates may have equal lengths, and the other electrode plates are formed to have different lengths. In this arrangement, the electrode plate 10' nearest to the movable piece 2 and the electrode plate 11 next to the electrode plate 10' preferably have equal lengths La'. For example, the electrode plates 14' and 16 provided in the middle position in the Y-axial direction may have equal lengths. Thereby, the design-flexibility is enhanced.

Moreover, according to the first preferred embodiment of the present invention, as shown in FIG. 4, the overlapping length L of the stationary-side electrode plate 7 and the movable-side electrode plate 10 in their initial positions is preferably set in the range of about 1 µm to 10 µm. However, according to preferred embodiments of the present invention, the overlapping length L is not restricted to the above-described range. The overlapping length may be set to a larger value. Moreover, if the electrodes 5 and 8 are desired to be reduced in the Y-axial direction, the overlapping length L may be set at a smaller value.

Similarly, according to the second preferred embodiment of the present invention, a part of the stationary-side electrode plates 23 to 33 having equal lengths may be formed, while a part of the movable-side electrode plates 36 to 45 having equal lengths are formed.

According to the first and third preferred embodiments of the present invention, the lengths of the movable-side electrode plates 10 to 19 and the movable-side electrode plates 57, 58, and 59 are different from each other, respectively, and the ends of the stationary-side electrode plates 7, 53, and 54 extend to the same positions in the Y-axial direction. However, the present invention is not restricted to the above-described configuration. The lengths of the electrode plates may be different from each other. The length may be stepwise increased in order from the electrode plate nearest to the movable piece 2 toward the electrode plate farthest from the movable piece 2.

According to the preferred embodiments of the present invention, the electrode plates 10 to 19, 23 to 33, 36 to 45, 57 to 59, 63 to 65, and 68 to 70 have lengths which are stepwise decreased in order from the electrode plate nearest to the movable piece 2 to the electrode plate farthest from the movable piece 2. However, the present invention is not restricted to this configuration. The lengths of the electrode plates may be stepwise increased in order from the electrode plate nearest to the movable piece 2 to the electrode plate farthest from the movable piece 2.

Moreover, according to the third and fourth preferred embodiments of the present invention, the electrode plates 57 to 59, the electrode plates 63 to 65, and the electrode plates 68 to 70 form three or four sets each including electrode plates having the equal lengths. However, the present invention is not restricted to this configuration. The number of electrode plates forming each set and the number of sets of electrode plates may be optionally set.

Moreover, according to the third preferred embodiment of the present invention, for the movable-side electrode plates 57, 58, and 59, plural electrode plates define each set having equal lengths, while the stationary-side electrode plates 54 have a larger width Wb. However, the present invention is not restricted to this configuration. A plurality of stationary-side electrode plates define sets of electrode plates having equal lengths, in which the lengths of the electrode plates are different for different sets. The movable-side electrode plates may have a larger width.

In the above-described preferred embodiments of the present invention, the electrostatic actuator is applied to an optical switching device. However, this is not restrictive. The present invention may be applied to different types of electrostatic type actuators including angular velocity sensors, resonators, and other suitable devices.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. An electrostatic actuator comprising:
   a substrate;
   a stationary electrode including a plurality of electrode plates disposed on the substrate in a comb-like pattern; and
   a movable piece supported on the substrate and including a movable electrode including a plurality of electrode plates extending toward the electrode plates of the stationary electrode and arranged in a comb-like pattern; wherein
   in one of the stationary electrode and the movable electrode, at least one of the lengths of the plurality of electrode plates is different from a length of another of the plurality of electrode plates; and
   the movable electrode displaces the movable piece by an electrostatic force generated between the movable electrode and the stationary electrode.

2. An electrostatic actuator according to claim 1, wherein in the other of the stationary electrode and the movable electrode, at least one of the lengths of the electrode plates is different from a length of another of the plurality of electrode plates.

3. An electrostatic actuator according to claim 1, wherein the plurality of electrode plates of at least one of the stationary electrode and the movable electrode have lengths which are stepwise different from each other.

4. An electrostatic actuator according to claim 1, wherein the plurality of electrode plates of at least one of the stationary electrode and the movable electrode have lengths which are stepwise decreased in order from an electrode plate nearest to the movable piece to an electrode plate farthest from the movable piece.

5. An electrostatic actuator according to claim 1, wherein the plurality electrode plates of at least one of the stationary electrode and the movable electrode define sets of electrode plates having equal lengths; and
   the length of at least one set of electrode plates is different from the length of another set of electrode plates.

6. An electrostatic actuator according to claim 5, wherein of the plurality of electrode plates of at least the other of the stationary electrode and the movable electrode, the electrode plates of the other electrode to be moved into the spaces between the sets of the electrode plates of the one electrode for meshing have widths larger than those of the adjacent electrode plates of the other electrode.

7. An electrostatic actuator according to claim 1, wherein the plurality of electrode plates of at least one of the stationary electrode and the movable electrode includes at least two electrode plates which have lengths which are equal to each other.

8. An electrostatic actuator according to claim 2, wherein the plurality of electrode plates of at least one of the stationary electrode and the movable electrode have lengths which are stepwise different from each other.

9. An electrostatic actuator according to claim 2, wherein the plurality of electrode plates of at least one of the stationary electrode and the movable electrode have lengths which are stepwise decreased in order from an electrode plate nearest to the movable piece.

10. An electrostatic actuator according to claim 2, wherein the plurality electrode plates of at least one of the stationary electrode and the movable electrode define sets of electrode plates having equal lengths; and
    the length of at least one set of electrode plates is different from the length of another set of electrode plates.

11. An electrostatic actuator according to claim 10, wherein of the plurality of electrode plates of at least the other of the stationary electrode and the movable electrode, the electrode plates of the other electrode to be moved into the spaces between the sets of the electrode plates of the one electrode for meshing have widths larger than those of the adjacent electrode plates of the other electrode.

12. An electrostatic actuator according to claim 3, wherein the plurality electrode plates of at least one of the stationary electrode and the movable electrode define sets of electrode plates having equal lengths; and
    the length of at least one set of electrode plates is different from the length of another set of electrode plates.

13. An electrostatic actuator according to claim 12, wherein of the plurality of electrode plates of at least the other of the stationary electrode and the movable electrode, the electrode plates of the other electrode to be moved into the spaces between the sets of the electrode plates of the one electrode for meshing have widths larger than those of the adjacent electrode plates of the other electrode.

14. An electrostatic actuator according to claim 4, wherein the plurality of electrode plates of at least one of the stationary electrode and the movable electrode define sets of electrode plates having equal lengths; and the length of at least one set of electrode plates is different from the length of another set of electrode plates.

15. An electrostatic actuator according to claim 14, wherein of the plurality of electrode plates of at least the other of the stationary electrode and the movable electrode, the electrode plates of the other electrode to be moved into the spaces between the sets of the electrode plates of the one electrode for meshing have widths larger than those of the adjacent electrode plates of the other electrode.

16. An electrostatic actuator according to claim 1, further comprising inclined portions disposed between the plurality of electrode plates of the stationary electrode.

17. An electrostatic actuator according to claim 1, wherein the plurality of electrode plates of at least one of the stationary electrode and the movable electrode have lengths which are stepwise increased in order from an electrode plate nearest to the movable piece to an electrode plate farthest from the movable piece.

18. An electrostatic actuator according to claim 1, wherein the plurality of electrode plates of at least one of the stationary electrode and the movable electrode have lengths which are stepwise changed in a convex line in order from an electrode plate nearest to the movable piece to an electrode plate farthest from the movable piece.

19. An electrostatic actuator according to claim 1, wherein in the other of the stationary electrode and the movable electrode, a width of at least one of the electrode plates is different from a width of another of the electrode plates.

20. An electrostatic actuator according to claim 3, wherein in the other of the stationary electrode and the movable electrode, a width of at least one of the electrode plates is different from a width of another of the electrode plates.

* * * * *